(12) United States Patent
Campbell et al.

(10) Patent No.: US 6,354,709 B1
(45) Date of Patent: Mar. 12, 2002

(54) OPTICAL FILM

(75) Inventors: Alan B. Campbell, Petaluma, CA (US); Sanford Cobb, Jr., St. Paul, MN (US); Wade D. Kretman, St. Paul, MN (US); Marvin J. Niezgocki, St. Paul, MN (US); Timothy L. Hoopman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/543,304

(22) Filed: Apr. 5, 2000

Related U.S. Application Data

(63) Continuation of application No. 09/025,183, filed on Feb. 18, 1999, now abandoned.

(51) Int. Cl.[7] .............................................. F21V 13/02
(52) U.S. Cl. ........................ 362/31; 362/339; 359/837
(58) Field of Search ........................... 362/26, 31, 309, 362/329, 339, 84, 330, 331, 336, 337; 359/837; 428/141, 156

(56) References Cited

U.S. PATENT DOCUMENTS

| | | | |
|---|---|---|---|
| 3,754,813 A | 8/1973 | Depalma et al. ............ 350/127 |
| 3,765,281 A | 10/1973 | Wolfe et al. ...................... 83/5 |
| 3,788,171 A | 1/1974 | Hoadley et al. .................. 83/5 |
| 3,851,093 A * | 11/1974 | Sustein ........................ 348/810 |
| RE29,091 E | 12/1976 | De Palma et al. ........... 350/127 |
| 4,542,449 A | 9/1985 | Whitehead ................... 362/330 |
| 4,791,540 A | 12/1988 | Dreyer, Jr. et al. ......... 362/331 |
| 4,804,253 A | 2/1989 | Stewart ........................ 350/330 |
| 4,906,070 A | 3/1990 | Cobb, Jr. .................... 350/286 |
| 4,984,144 A | 1/1991 | Cobb, Jr. et al. ............ 362/339 |
| 5,005,108 A | 4/1991 | Pristash et al. ................ 362/31 |
| 5,076,668 A | 12/1991 | Dalisa et al. ................... 359/51 |
| 5,128,783 A | 7/1992 | Abileah et al. ................ 359/49 |
| 5,161,041 A | 11/1992 | Abileah et al. ................ 359/40 |
| 5,190,370 A | 3/1993 | Miller et al. ................. 362/340 |
| 5,280,371 A | 1/1994 | McCartney, Jr. et al. ..... 359/40 |
| 5,394,255 A | 2/1995 | Yokota et al. ................. 359/49 |
| 5,467,208 A | 11/1995 | Kokawa et al. ............... 359/49 |
| 5,467,417 A | 11/1995 | Nakamura et al. ........... 385/36 |
| 5,521,797 A | 5/1996 | Kashima et al. .............. 362/31 |
| 5,550,657 A | 8/1996 | Tanaka et al. ................. 359/49 |
| 5,552,907 A | 9/1996 | Yokota et al. ................. 359/49 |
| 5,592,332 A | 1/1997 | Nishio et al. ............... 359/619 |
| 5,596,429 A | 1/1997 | Kokawa et al. ............... 349/67 |
| 5,598,280 A | 1/1997 | Nishio et al. ................. 349/57 |
| 5,600,455 A | 2/1997 | Ishikawa et al. .............. 349/57 |
| 5,600,462 A | 2/1997 | Suzuki et al. ............... 349/112 |
| 5,627,926 A | 5/1997 | Nakamura et al. ........... 385/36 |
| 5,771,328 A * | 6/1998 | Wortman ..................... 385/146 |
| 5,919,551 A * | 7/1999 | Cobb .......................... 428/156 |
| 6,052,164 A * | 4/2000 | Cobb ............................ 349/64 |

FOREIGN PATENT DOCUMENTS

| | | | |
|---|---|---|---|
| DE | 3407 431 A1 * | 2/1984 | |
| EP | 531939 | 3/1993 | ............ G09F/13/16 |
| JP | 6-18707 | 1/1994 | ............ G02B/5/02 |
| WO | WO 96/27757 | 9/1996 | ............ F21V/5/02 |
| WO | WO 97/28468 | 8/1997 | ............ F02B/5/04 |

* cited by examiner

*Primary Examiner*—Alan Cariaso
*Assistant Examiner*—Hargobind S. Sawhney
(74) *Attorney, Agent, or Firm*—Stephen W. Buckingham

(57) ABSTRACT

An optical film having structures that vary in height along their length where the variations have a nominal period of less than forty times the nominal height of the structures is taught. In some embodiments of the invention the variation is random.

25 Claims, 7 Drawing Sheets

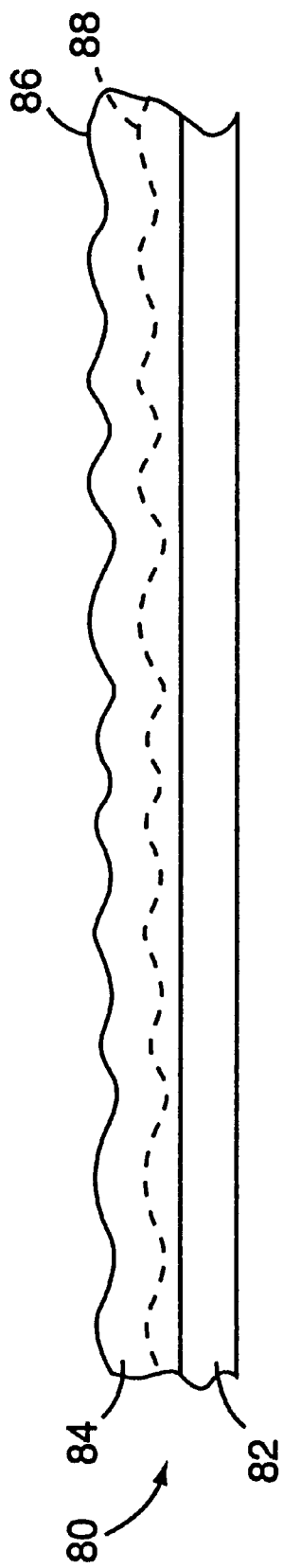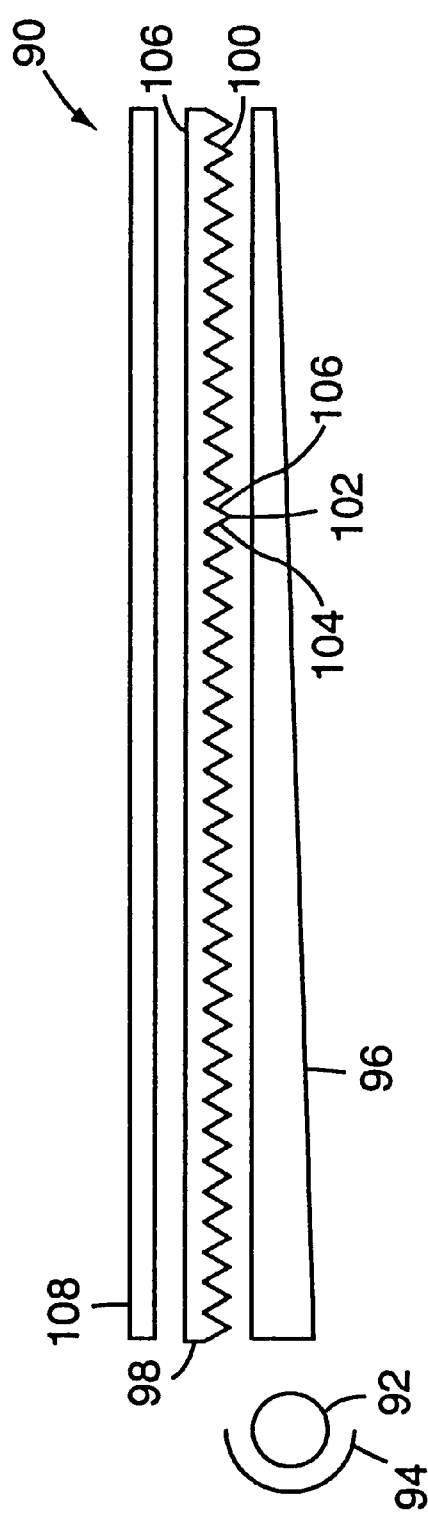

OPTICAL FILM

This application is a continuation of Ser. No. 09/025,183 Feb. 18, 1998 abn.

BACKGROUND OF THE INVENTION

The use of a variety of structured surface films in backlit displays is well known. For example, U.S. Pat. No. 5,161, 041 ("Abileah") describes a prismatic film to enhance the apparent brightness of a backlit liquid crystal display. The Abileah patent further describes the use of two such structured surface films, preferably with the structures oriented perpendicular to one another, to further enhance the apparent brightness of such a display. In general, the increase in on-axis brightness produced by such a structured surface film is known as the "gain" of such a film. The on-axis gain of a film refers to the ratio of the intensity of light as measured in a direction perpendicular to the backlight with the film to the intensity observed in a direction perpendicular to the same backlight without the film.

Other structured surface films may be used to redirect light traveling in one direction to a more desired output angle. U.S. Pat. Nos. 4,984,144 ("Cobb et al.") and 5,190, 370 ("Miller et al."), the teachings of which are incorporated herein by reference, teach light fixtures utilizing such films. These light fixtures could be used as backlights for displays.

One problem with using films such as those described above in a display that is intended for close viewing, such as a computer display, is that the cosmetic requirements are very high. This is because, when such displays are studied very closely or used for an extended period of time, even very small defects may be visible and annoying. Elimination of such defects can be very costly both in inspection time and discarded materials.

There are several approaches to the problems created by the visibility of such small defects and consequent low manufacturing yield. One solution is to simply accept the relatively high rejection rate of common manufacturing processes. A second solution is to provide more efficient, and expensive, clean rooms, use only ultra-clean materials, use extraordinary care in the preparation of manufacturing tooling, and employ extremely rigid quality control procedures. While this will reduce the waste, it can introduce even more expense in order to produce higher yield.

Another solution is to provide the film with a diffuser. This may be a matte finish on the smooth side, the structured side, or both, of the film or a bulk diffuser provided in the film. Such diffusers will hide many of the defects, making them invisible to the user. This will significantly improve manufacturing yield, while only adding a small increase in cost to the manufactured part. The disadvantage of this approach is that the diffuser will scatter the light and thus decrease on-axis gain. Therefore, a diffuser will increase yield but at the expense of some performance.

Another problem that has been observed in prior art systems utilizing two sheets of brightness enhancing film, as described above, is known as "wet-out." Wet-out occurs as a result of optical coupling between the prisms of one sheet and the smooth surface of the other. The optical coupling prevents total internal reflection from occurring along these peaks, thus destroying the brightness enhancing effect desired. The result is a mottled and varying appearance to the backlight.

SUMMARY OF THE INVENTION

According to the present invention an optical film has structures that vary in height along their length where the variations have a nominal period of less than forty times the nominal height of the structures. In some embodiments of the invention the variation is random.

BRIEF DESCRIPTION OF THE DRAWINGS

FIG. 10 shows a third film according to the invention; and

FIG. 11 shows a light fixture utilizing a light redirecting film according to the invention.

DETAILED DESCRIPTION

Figure 1:
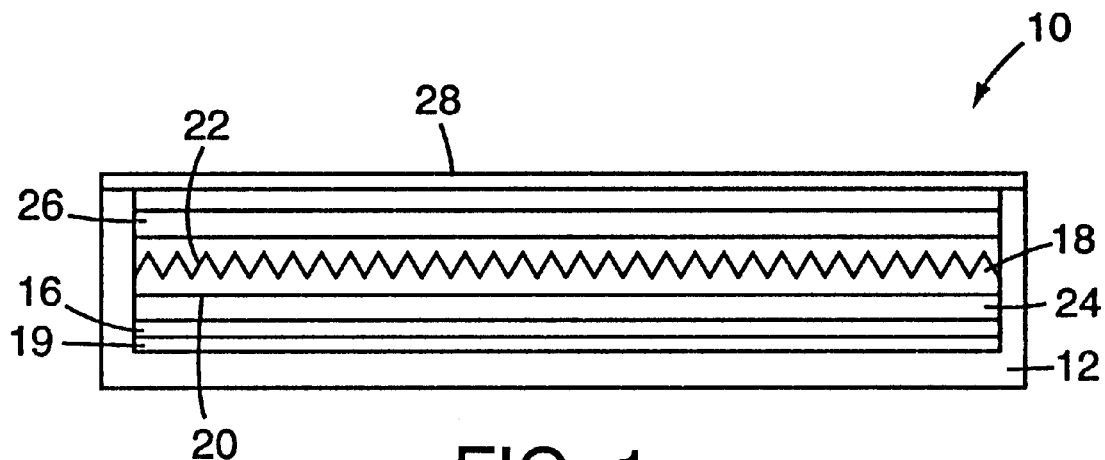
FIG. 1 shows a display utilizing a brightness enhancing film.

FIG. 1 illustrates a first embodiment of a display, 10, according to one aspect of the invention. Display 10 includes a case 12. Display 10 includes an area source of light 16 and a structured surface material 18. Generally, area light source 16 is a thin, solid light guide that receives light through one or more of its narrow edges from one or more line light sources, such as fluorescent tubes, although other area light sources such as electroluminescent materials may be used. Typically, if a solid light guide is used, it will be of an acrylic material and conduct light by total internal reflection. Generally the light guide will have diffusely reflective dots on the back to extract light in the direction of structured surface material 18. The operation of such area light sources is well known in the art. A reflective material, 19, is preferably positioned behind area light source 16. Reflective material 19 is preferably a diffuse reflector.

Structured surface material 18 has a smooth surface 20 and a structured surface 22. Smooth surface 20 lies toward the back of display 10 and structured surface 22 lies toward the front. Structured surface material 18 and area light source 16 are separated by an optical diffuser 24. Structured surface 22 has a light exit wedge associated therewith and smooth surface 24 has a light entry wedge associated therewith, where the light exit wedge is narrower that the light entry wedge. Although surface 24 is described here as smooth, it could also have structures thereon. Structured surface material 18 and its operation in the invention will be described in greater detail in conjunction with FIGS. 2 and 3.

Display 10 further includes a light gating device 26. Typically light gating device 26 is a liquid crystal display, although other light gating devices may be used. As is well known in the art, a liquid crystal display may be made transparent or opaque, in the case of a monochrome display, or transparent or a variety of colors in the case of a color display by the proper application of electrical signals. This will form images that will be visible when area light source 16 is illuminated. Display 10 further includes a transparent cover sheet 28.

Figure 2:
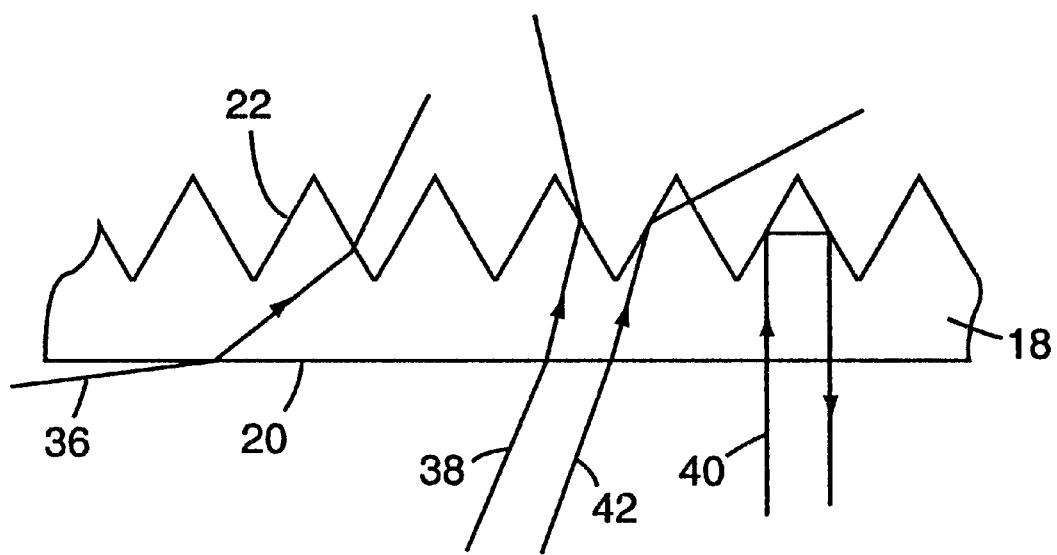
FIG. 2 shows a brightness enhancing film.

FIG. 2 is an enlargement of structured surface material 18 of FIG. 1. As described previously, structured surface material 18 has a smooth side 20 and a structured side 22. Structured side 22, in the preferred embodiment, includes a plurality of triangular prisms. In the preferred embodiment, such prisms are right isosceles prisms, although prisms having other peak angles may be used. Prisms with peak angles in the range of 70 degrees to 110 degrees have been shown to work with varying degrees of effectiveness with the invention. Furthermore the peaks, valleys or both of the prism structures may be curved in cross section. Although this will decrease the gain provided by the structures, it will provide other effects that are sometimes desirable Structured surface material 18 may be of any transparent material having an index of refraction greater than that of air, but, in general, the materials with higher indices of refraction will produce better results. Polycarbonate, which has an index of refraction of 1.586, has proven to work very effectively. For purposes of description of a preferred embodiment of the invention, the prisms on structured surface 22 will be assumed to have included angles of 90 degrees and structured surface material 18 will be assumed to be of polycarbonate.

Figure 3:
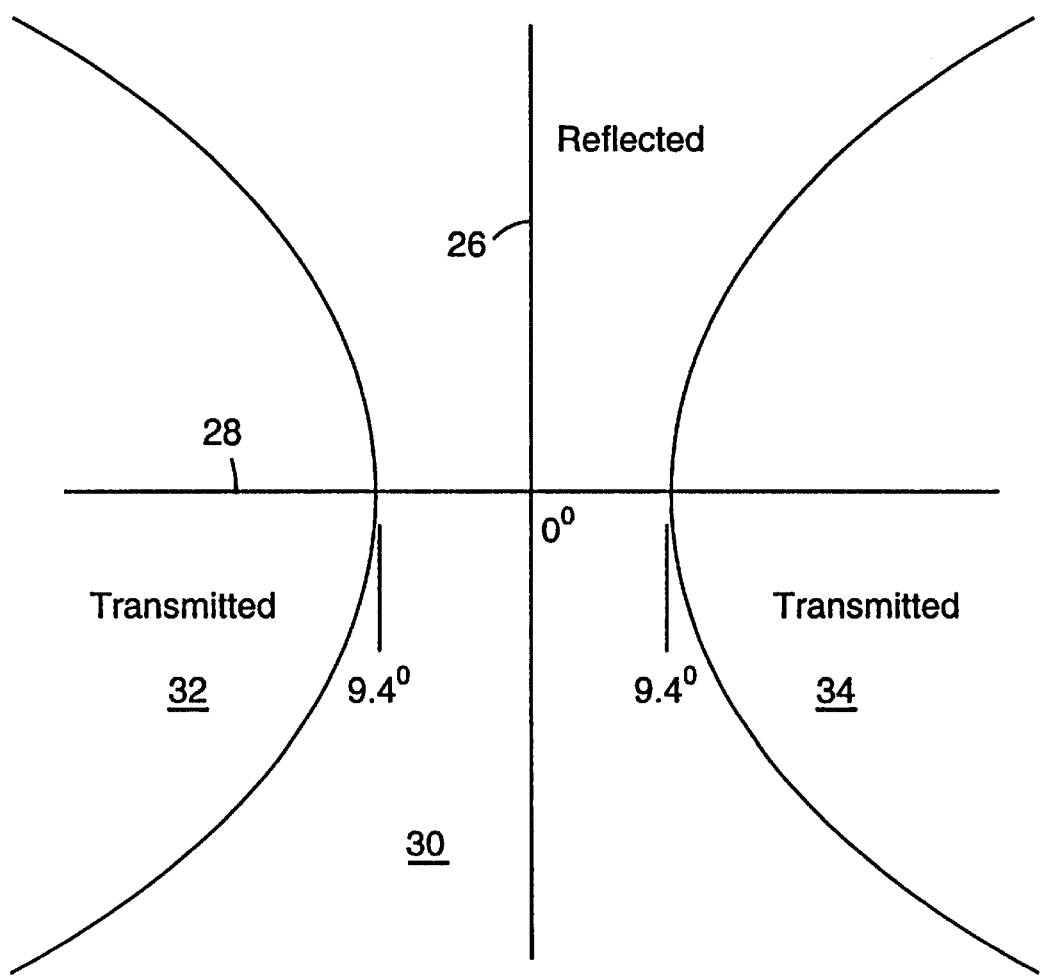
FIG. 3 is a graph showing the operation of a brightness enhancing film.

FIG. 3 illustrates the operation of structured surface material 18. FIG. 3 is a graph having two axes 26 and 28. These axes represent the angle that a light ray makes to a normal to smooth surface 20. Specifically, axis 26 represents the angle that the light ray makes when the direction of the light ray is projected into a plane parallel to the linear extent of the structures on structured surface 22. Similarly axis 28 represents the angle that the light ray makes to a normal to smooth surface 20 when the direction of the light ray is projected into a plane perpendicular to the linear extent of the structures on structured surface 22. Thus a light ray striking perpendicular to smooth surface 20 would be represented by the origin, labeled 0 degrees, of the graph of FIG. 3. As may be seen, FIG. 3 is divided into regions 30, 32, and 34. Light rays striking at angles that fall within region 30 will enter structured surface material 18 but be totally internally reflected by structured surface 22 so that they pass through smooth surface 20 a second time and reenter diffuser 24. Light rays striking smooth surface 20 at an angle such that they fall in region 32 or 34 will be transmitted but refracted to a different angle with respect to the normal. As may be seen from FIG. 3, which represents the performance of polycarbonate, any light ray striking smooth surface 20 at an angle of less than 9.4 degrees to the normal, will be reflected.

Returning to FIG. 2, four exemplary light rays are shown. The first, light ray 36, approaches smooth surface 20 at a grazing angle, i.e., an angle to the normal approaching 90 degrees. If light ray 36 makes an angle of 89.9 degrees to the normal to surface 20 when it strikes structured surface material 18, it will be refracted such that it makes an angle of 39.1 degrees to the normal as it travels through structured surface material 18. Upon reaching structured surface 22, it will be refracted again. Because of the structures on structured surface 22, it will be refracted so that again it will make a smaller angle to the normal to structured surface 20. In the example it will make an angle of 35.6 degrees.

Light ray 38 approaches smooth surface 20 at an angle much closer to the normal to smooth surface 20. It also is refracted as it passes through smooth surface 20, but to a lesser extent. If light ray 38 approaches smooth surface 20 at an angle of 10 degrees to the normal to smooth surface 20, it will emerge from structured surface 22 at an angle of 37.7 degrees to the normal to smooth surface 20 but on the opposite side of that normal.

Light ray 40 approaches at an angle even closer to the normal to smooth surface 20 than did light ray 38 and is totally internally reflected twice by structured surface 22 and returned to the interior of display 10.

Finally, light ray 42 approaches smooth surface 20 at an angle similar to that of light ray 38, but in a location such that it is totally internally reflected by one side of a prism on structured surface 22 but not by the second side. As a result it emerges at a large angle to the normal to smooth surface 20. Because such a reflection only occurs to a light ray that is traveling in a direction that forms a high incidence angle to the side it strikes, the prisms provide a very small cross section to such rays. In addition many of those rays will reenter the next prism and be returned into display 10.

A fifth class of light ray is not shown in FIG. 2. This is the set of light rays that are reflected by smooth surface 20 and do not enter structured surface material 18. Such light rays simply join the others that are reflected back into display 10.

As may be seen from this discussion, light that, absent structured surface material 18, would have emerged from the display at a high angle to the axis of the display, where the axis of the display is taken to be the normal to smooth surface 20, is redirected into a direction closer to that axis. A small amount of light will be directed out at a large angle to the axis. Thus, we may say that light that enters structured surface material 18 through smooth surface 20 with an angle of incidence greater than a predetermined angle is directed into an output wedge that is narrower than the input wedge and the majority of the light that enters structured surface material 18 through smooth surface 20 at an angle of incidence of less than that predetermined angle will be reflected back into display 10.

The light that is reflected back into display 10 will strike reflector 19 and diffuser 24. This light will be reflected and diffused and then will travel back to structured surface material 18, in general at a different angle than it made the first time. The process is then repeated so that more of the light is redirected into the smaller wedge. Generally, a brightness enhancing film such as structured surface material 18 will be capable of reflecting light striking it in a first predetermined group of angles and passing, but refracting, light striking it in a second predetermined group of angles wherein the angles in the second group of angles are greater than those in the first group of angles and wherein the light in the second group of angles is refracted into an output wedge that is narrower than its input wedge. Furthermore, the system must be capable of recycling the light that is reflected by structured surface film 18 so that the majority of the light available to the system is eventually emitted in the narrower output wedge.

Figure 4:
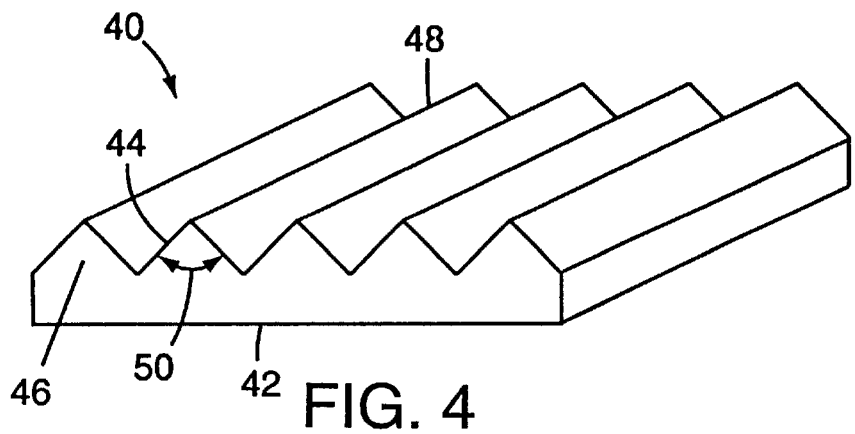
FIG. 4 shows a brightness enhancing film of the prior art.

FIG. 4 shows a typical brightness enhancing film of the prior art, designated generally as 40. Brightness enhancing film 40 has a smooth surface 42 and a structured surface 44. Structured surface 44 includes a plurality of linear prisms such as prism 46. Each prism on structured surface 44 has a peak such as peak 48. Each peak such as peak 48 has associated therewith a peak angle such as peak angle 50. Preferably, the peak angles such as peak angle 50 are 90°, although deviation from 90° is possible. Furthermore, it is known that the peaks such as peak 48 may be curved in cross section rather than sharply pointed. Using a curved or rounded peak, however, will reduce the gain of the brightness enhancing film. Generally, however, according to the prior art, the peaks such as peak 48 have been straight lines that individually maintained an essentially uniform distance from surface 42. In some prior art embodiments, surface 42 is not planar but has a structure thereon. In such cases, there is a plane that is generally associated with surface 42 and peak line 48 runs at a constant distance from the plane associated with surface 42.

Figure 5:
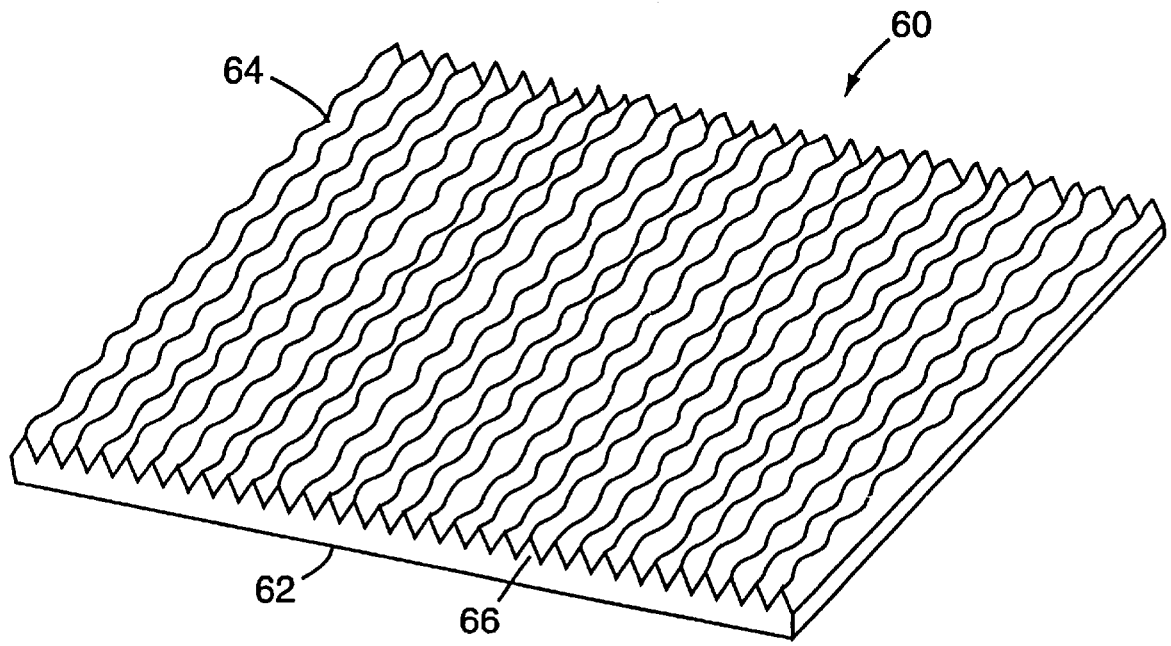
FIG. 5 shows an optical film according to the invention.

FIG. 5 shows an optical film 60 according to the present invention. Optical film 60 a structured surface 64 and an opposing surface 62. Opposing surface 62 could be optically smooth or could be relatively smooth but provided with a matte surface or other surface diffuser. Alternatively, various structures could also be formed on opposing surface 62.

Structured surface 64 has a plurality of structures such as structure 66. For a brightness enhancing film structure 66 acts effectively like the prisms of FIG. 4 but the peak does not form a straight line as do the peaks of the structures of FIG. 4. Instead the heights of the peaks of the prisms of the film shown in FIG. 5 vary continuously along their lengths. Similarly the depths of the valleys between the peaks vary continuously. Alternatively stated, the distances from the peak lines and/or the valley lines of the structures on structured surface 64, or simply from the structures themselves, to the plane associated with opposing surface 62 are continuously varying. In general, the actual heights of the structures, or the distances from the structures to the plane associated with opposing surface 62, vary between 2% and 12% and more preferably between 4% and 8% of the nominal or average height of the structures. The nominal or average period of the variations preferably should be between four and forty times the height of the structures. More preferably, the nominal period of the variations should be between five and sixteen times the nominal height of the structures. Preferably, the actual height varies by an amount and with a nominal period sufficient to substantially mask the small cosmetic defects typically encountered in the manufacturing process. Preferably, the actual height varies by an amount and with a nominal period sufficient to substantially mask cosmetic point or spot defects having maximum dimensions equal to or less than eight times or more preferably equal to or less than ten times the nominal height of the structures and most scratch defects.

This variation in the heights of the prisms causes several unexpected results. First films according to the invention do not look like high performance, transparent, optical films. Instead they have a deceptive, almost hazy, appearance that masks some of the small defects in the prism sheets discussed above. This can considerably improve the yield of the manufacturing process. Second, it reduces the area where the structured surface of a prism sheet can contact the smooth surface of an adjacent sheet, thus reducing the area where optical coupling can occur. This significantly improves the visual quality of the assembled display. Films of the invention will also help to eliminate or hide moire patterns resulting from interference between the prisms and the pixel pattern of the LCD. The most surprising result, however, is that a brightness enhancing film according to the invention accomplishes all of this while still providing essentially the same gain as a prior art film of the same material and having the same prism spacing or pitch.

Brightness enhancing films according to the invention could be of any substantially transparent material. A bulk diffusing material could be incorporated in a film according to the invention, although in many cases this will degrade the performance of the optical film. Unitary, extruded films of acrylics and polycarbonates work well. Alternatively, the film could be a two part construction in which the structured surface according to the invention is cast and cured on a substrate. For example, ultraviolet-cured acrylics cast on polyester substrates may be used. Films of polyethylene terphthalate ("PET") have been shown to work well as substrates on which structures of the invention may be cured. Biaxially oriented PET is often preferred for its mechanical and optical properties. A smooth polyester film that may be used as a substrate is commercially available from ICI Americas Inc. Hopewell, Va. under the tradename Melinex™ 617. A matte finish coating that may be applied on a film to be used as a substrate is commercially available from Tekra Corporation of New Berlin, Wis. under the tradename Marnot™ 75 GU. Other films could be used as well. These films could be chosen for their optical, mechanical, or other properties. For example, a substrate could be a multi-layer optical film as described in published PCT patent application WO-97/01774 the teaching of which is incorporated herein by reference. Examples of other films that could be used are wavelength selective multi-layer optical films and reflective polarizers. Reflective polarizers could be multi-layer films, cholesteric materials, or materials of the type disclosed in published PCT patent application WO-97/32227 the teaching of which is incorporated herein by reference.

For brightness enhancing films according to the invention, the included angles of the structures of structured surface may be any angle in the range of 70° to 110° and more preferably in the range of 80° to 100°. Most preferably an angle of 90° is used to provide the highest gain. If a lower gain with a softer transition at the boundary of the output wedge is desired, the peaks or valleys or both of the structures could be rounded. It is even possible to use a continuously varying contour, such as a sinusoidal structure, although the gain will be significantly reduced. In another embodiment the structures do not need to be symmetric. For example they could be canted as shown in published PCT patent application WO-97/28468, the disclosure of which is incorporated herein by reference.

The pitch of the structures of a brightness enhancing film according to the invention is preferably between 10 $\mu$m and 100 $\mu$m and more preferably between 24 $\mu$m and 50 $\mu$m. A pitch of 50 $\mu$m has been found to work quite well. The preferred pitch will depend, in part, on the pixel pitch of the liquid crystal display. The prism pitch should be chosen to help minimize moire interference.

Figure 6:
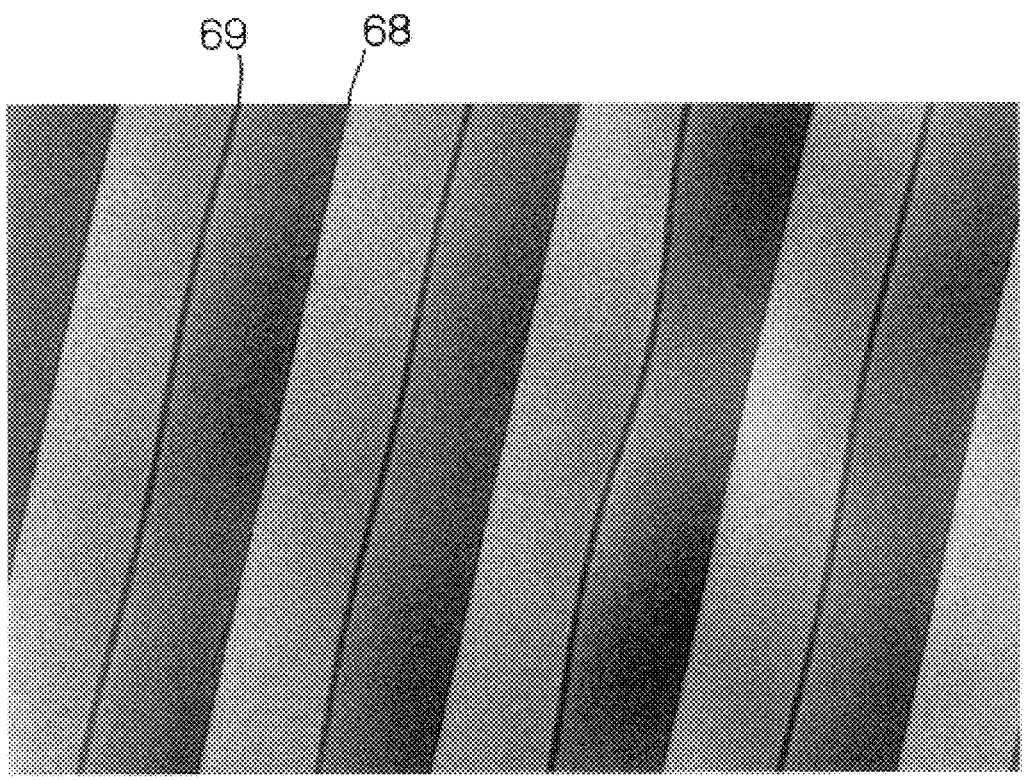
FIG. 6 is a photo-micrograph of an optical film according to the invention.
Figure 7:
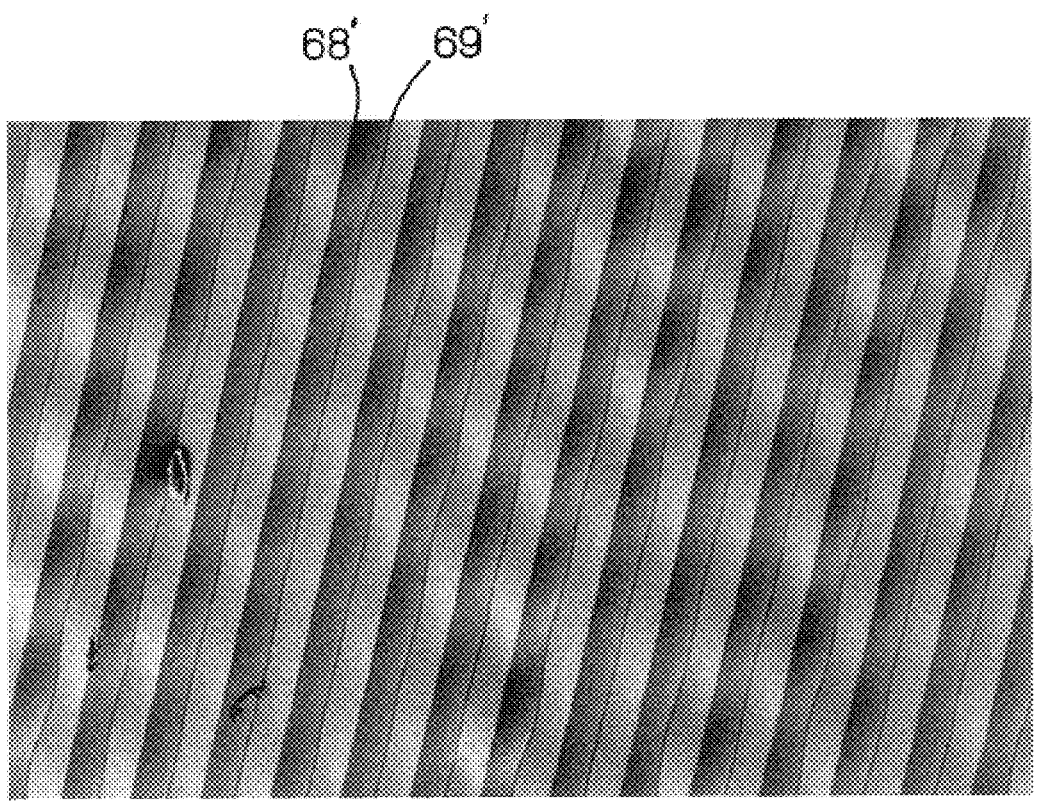
FIG. 7 is a photo-micrograph of an optical film according to the invention.

FIGS. 6 and 7 are images of optical films according to the invention produced by a scanning electron microscope. Both of the films shown have prismatic structures with 90° included angles. The pitch of the prisms in each film is 50 $\mu$m. Reference numerals 68 and 68' indicate prism peaks and reference numerals 69 and 69' indicate prism valleys. The variation of the peaks and valleys of the prisms may be clearly seen in these images.

Masters for the tools used for manufacturing brightness enhancing films, whether by extrusion or by a cast and cure process, may be made by known diamond turning techniques. Typically the tools are made by diamond turning on a cylindrical blank known as a roll. The surface of the roll is typically of hard copper, although other materials may be used. The prism structures are formed in continuous patterns around the circumference of the roll. In a preferred embodiment the grooves are produced by a technique known as thread cutting. In thread cutting, a single, continuous groove is cut on the roll while the diamond tool is moved in a direction transverse to the turning roll. If the structures to be produced have a constant pitch, the tool will move at a constant velocity. A typical diamond turning machine will provide independent control of the depth that the tool penetrates the roll, the horizontal and vertical angles that the tool makes to the roll and the transverse velocity of the tool.

Figure 8:
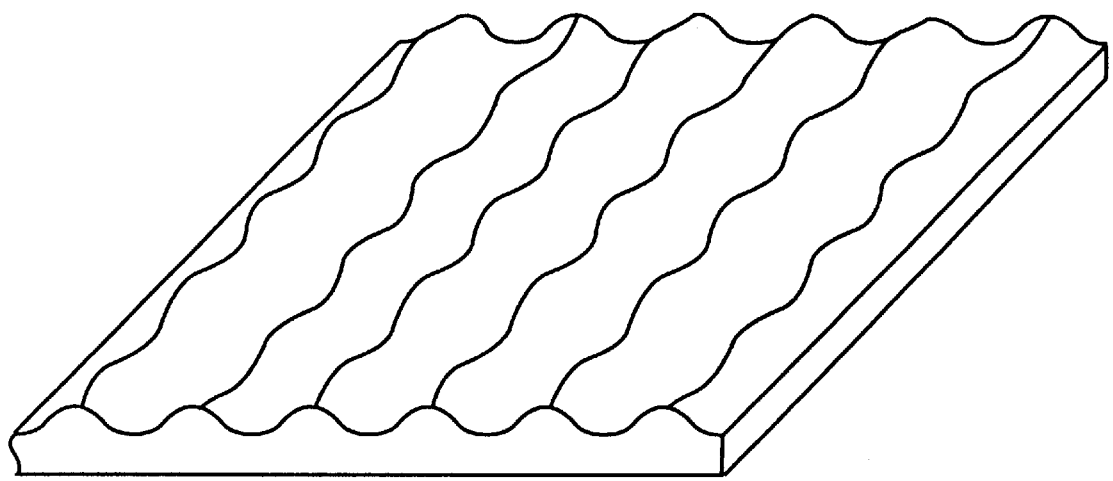
FIG. 8 shows a second optical film according to the invention.

FIG. 8 shows an alternative embodiment of the invention in which the structures have rounded peaks and valleys rather than the sharp peaks and valleys shown in FIG. 5. In another alternative embodiment, the variation in the structures may have sharp discontinuities rather than be smoothly varying as shown in FIGS. 5 and 8.

Figure 9:
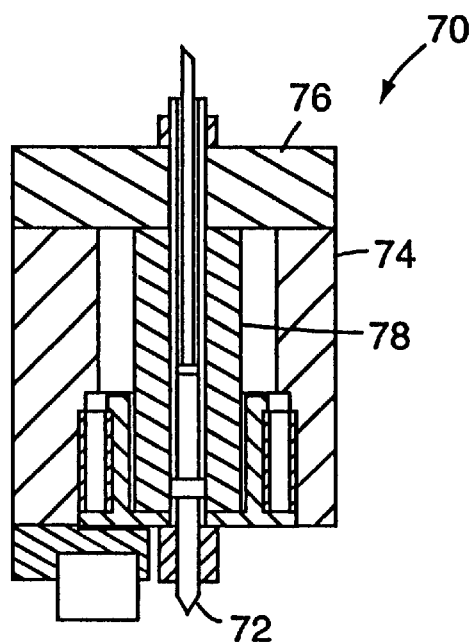
FIG. 9 shows a fast tool servo actuator for use in manufacturing a film according to the invention.

In order to produce the structures of the invention a fast tool servo actuator is added to the diamond turning apparatus. A fast tool servo actuator, designated generally as 70, is shown in FIG. 9. A diamond tool, 72, extends from a case including walls 74 and back 76. Diamond tool 72 is supported by a piezoelectric stack 78. When piezoelectric stack 72 is stimulated by a varying electrical signal, it will cause diamond tool 72 to be moved such that the distance that it extends from the case changes. It is possible for the piezoelectric stack to be stimulated by a signal of constant or programmed frequency, but it is generally preferable to use a random or pseudo random frequency. As used herein, the term random will be understood to include pseudo random. The tool so produced may then be used in standard extrusion or cast and cure processes to produce an optical film.

In a test of the present invention a brightness enhancing film having a pitch of 50 μm and sharp prism peaks and valleys, all having included angles of 90°, was made. The fast tool servo actuator was set to allow the diamond tool to move in the depth of cut direction with an amplitude of 2 μm. Since the height of a right angle prism is half of its width, this made the variation equal to about 8% of the nominal height of the structure. The fast tool servo actuator was stimulated with white noise filtered by a band pass filter that transmitted 4 KHz to 5.6 KHz. The diamond turning machine was set so that the roll would turn at a speed such that its surface would have a velocity of approximately 0.8 m per second and a brightness enhancing pattern was thread cut on the roll. This produced a structured surface pattern with a variation according to the invention having a nominal period of approximately 145 μm. This pattern was a continuous groove on the roll with a nominal depth corresponding to the nominal height of the structure on the film to be manufactured. The result was a brightness enhancing film having essentially the same gain as one without the structure produced with the fast tool servo actuator, but with significantly fewer observable defects.

FIG. 10 is a side view of an optical film, 80, according to the invention. Film 80 includes a substrate 82 and a structured surface portion 84. The prism peak, 86, varies in height along its length. The prism valley, indicated by hidden line 88, has a similar variation.

FIG. 11 shows a display, 90, using a light redirecting film according to the invention. Light from lighting element 92 is directed by reflector 94 into light guide 96. Lighting element 92 is typically a fluorescent tube, although other lighting elements could be used. As shown, light guide 96 is a wedge, but other shapes such as pseudo wedges could be used. Light guide 96 could be transparent or could include a bulk diffuser. Light emerging from light guide 96 at a low or grazing angle will enter light redirecting film 98. Light redirecting film 98 has a structured surface side 100. Structured surface side 100 has a plurality of linear prisms such as linear prism 102. Linear prism 102 has a first side 104 and a second side 106. Light from light guide 96 will enter light redirecting film 98 through the first sides of the linear prisms such as first side 104 and be totally internally reflected by second side 104 and emerge from light redirecting film 98 through opposing surface 106. The light will then pass through a light gating device 108. Light gating device 108 is typically a liquid crystal.

As with a brightness enhancing film, light redirecting film 98 could be extruded or cast and cured on a substrate. The shape and size of prisms such as prism 102 will be dictated by the design of light guide 96 and the nature of light gating device 108. Typically, light emerging from light redirecting film 96 should be traveling in a direction normal to the surfaces of light gating device 108. Generally, this will require that the sides of the linear prisms, such as sides 104 and 108, are substantially flat. However, if a greater angular spread of light output is desired, the sides of the prisms may be curved in cross section. The linear prisms, such as prisms 102 may be symmetric or asymmetric. In general in symmetric designs the prisms for a light redirecting film will have peak angles in the range of 60° to 72° and asymmetric designs will have smaller peak angles. The exact design however, will always depend on the backlight and desired result.

What is claimed is:

1. An optical film comprising a structured surface and an opposing surface, said structured surface having a plurality of structures thereon, each of the structures having a nominal height and an actual height, said actual heights of at least some of said structures varying along the length of said structures, said variations having a nominal period of less than forty times said nominal height.

2. The optical film of claim 1 wherein said nominal period is between four and forty times said nominal height.

3. The optical film of claim 1 wherein said nominal period is between five and sixteen times said nominal height.

4. The optical film of claim 1 wherein said structures are linear prisms.

5. The optical film of claim 4 wherein said prisms have included angles in the range of 70° to 110°.

6. The optical film of claim 5 wherein said prisms are symmetric.

7. The optical film of claim 6 wherein said nominal period is between four and forty times said nominal height.

8. The optical film of claim 4 wherein said prisms have included angles in the range of 60° to 72°.

9. The optical film of claim 8 wherein said nominal period is between four and forty times said nominal height.

10. The optical film of claim 1 wherein said actual heights of at least some of said structures vary along the length of said structures by an amount between 2% and 12% of said nominal height.

11. The optical film of claim 10 wherein said nominal period is between four and forty times said nominal height.

12. The optical film of claim 10 wherein said actual heights of at least some of said structures vary along the length of said structures by an amount between 4% and 8% of said nominal height.

13. The optical film of claim 1 wherein said opposing surface is a matte surface.

14. An optical film comprising a structured surface and an opposing surface, said structured surface having a plurality of structures thereon, said structures having a nominal height and an actual height, said actual heights of at least some of said structures having a random variation of at least 2% of said nominal height.

15. An optical film comprising a structured surface and an opposing surface, said structured surface having a plurality of structures thereon, said structures having a nominal height and an actual height, said actual height of at least some of said structures varying by an amount and with a nominal period such that the combination of said height variation and said nominal period thereof mask small cosmetic defects that would otherwise be observable in said optical film.

16. The optical film according to claim 15 wherein said actual height of at least some of said structures varies by an amount and with a nominal period sufficient to substantially mask cosmetic defects having maximum dimensions equal to or less than eight times said nominal height of said structures.

17. An optical film comprising a structured surface and an opposing surface said opposing surface having a plane associated therewith, said structured surface having a plurality of structures thereon said structures having a nominal height, said structures varying in distance from said plane with a nominal period of less than forty times said nominal height.

18. An optical film comprising a structured surface and an opposing surface, said opposing surface having a plane associated therewith, said structured surface having thereon a plurality of structures, said structures reflecting light entering said film through said opposing surface while making an angle in a first predetermined group of angles with a normal to said plane associated with said opposing surface and refracting light entering said optical film while making an angle in a second predetermined group of angles to said normal to said plane associated with said opposing surface such that a majority of the light exiting said optical film through said structured surface will exit in an output wedge that is smaller than the input wedge and said structures have a nominal height and an actual height, said actual height of at least some of said structures continuously varying with a nominal period of variation less than forty times said nominal height.

19. An optical film comprising a structured surface and an opposing surface, said opposing surface having a plane associated therewith, said structured surface having thereon a plurality of structures, said structures reflecting light entering said film through said opposing surface while making an angle in a first predetermined group of angles with a normal to said plane associated with said opposing surface and refracting light entering said optical film while making an angle in a second predetermined group of angles to said normal to said plane associated with said opposing surface such that a majority of the light exiting said optical film through said structured surface will exit in an output wedge that is smaller than the input wedge and said structures have a nominal height and an actual height, said structures having a nominal height and an actual height, said actual height of at least some of said structures varying by an amount and with a period sufficient to substantially mask cosmetic defects having maximum dimensions equal to or less than eight times said nominal height in said optical film.

20. A display comprising:
   an area source of light;
   an optical film including a structured surface having a light exit wedge associated therewith and an opposing surface having a light entry wedge associated therewith said exit wedge being narrower than said entry wedge, said opposing surface facing said area light source, and said structured surface having structures thereon, said structures having an actual height and a nominal height, said actual height of at least some of said structures continuously varying with a nominal period of variation less than forty times said nominal height; and
   a light gating device separated from said area source of light by said optical film.

21. A display according to claim 20 further including an optical diffuser between said structured surface material and said area light source.

22. A display according to claim 20 wherein said light gating device includes a liquid crystal device.

23. A display according to claim 20 further including a reflector on a side of said area source of light opposite said structured surface material.

24. A display according to claim 23 wherein said light gating device includes a liquid crystal device.

25. A display according to claim 24 further including an optical diffuser between said structured surface material and said area light source.

\* \* \* \* \*

UNITED STATES PATENT AND TRADEMARK OFFICE
CERTIFICATE OF CORRECTION

PATENT NO.     : 6,354,709 B1
DATED          : March 12, 2002
INVENTOR(S)    : Campbell, Alan B.

It is certified that error appears in the above-identified patent and that said Letters Patent is hereby corrected as shown below:

Title page,
Item [63], Related U.S. Application Data, delete "filed on Feb. 18, 1999" and insert in place thereof -- filed on Feb. 18, 1998 --.

Column 10,
Line 4, delete "said structures having a nominal height and an actual height," after -- height, --.

Signed and Sealed this

Seventeenth Day of June, 2003

JAMES E. ROGAN
*Director of the United States Patent and Trademark Office*